(12) United States Patent
Hibbler et al.

(10) Patent No.: US 6,357,757 B1
(45) Date of Patent: Mar. 19, 2002

(54) INTEGRAL SEAL PROTECTOR/LABYRINTH

(75) Inventors: John Clinton Hibbler, Lake Orion; David Marshall Morse, Waterford; Rajendra G. Kumashi, Clarkston, all of MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/520,269

(22) Filed: Mar. 7, 2000

(51) Int. Cl.$^7$ ............................................... F16J 15/32
(52) U.S. Cl. ........................ 277/551; 277/350; 277/560
(58) Field of Search ................................. 277/350, 351, 277/551, 560, 562, 565

(56) References Cited

U.S. PATENT DOCUMENTS

| | | | |
|---|---|---|---|
| 4,376,541 A | 3/1983 | Walter et al. | |
| 4,448,426 A | 5/1984 | Jackowski et al. | |
| 4,470,605 A | * 9/1984 | Deuring | 277/560 |
| 4,508,020 A | 4/1985 | Szcupak | |
| 4,696,479 A | 9/1987 | Karcher | |
| 4,721,312 A | 1/1988 | Hornberger | |
| 4,770,425 A | 9/1988 | Colanzi et al. | |
| 4,943,068 A | 7/1990 | Hatch et al. | |
| 4,958,942 A | 9/1990 | Shimizu | |
| 5,015,001 A | * 5/1991 | Jay | 277/560 |
| 5,096,207 A | 3/1992 | Seeh et al. | |
| 5,183,269 A | 2/1993 | Black et al. | |
| 5,186,472 A | 2/1993 | Romero et al. | |
| 5,209,499 A | * 5/1993 | Ruff | 277/560 |
| 5,398,942 A | 3/1995 | Duckwall et al. | |
| 5,458,420 A | 10/1995 | Otto | |

* cited by examiner

Primary Examiner—Anthony Knight
Assistant Examiner—E Peavey
(74) Attorney, Agent, or Firm—Harness, Dickey & Pierce, P.L.C.

(57) ABSTRACT

A seal assembly having a case, an annular seal member and an annular guide member. The case is adapted to be mounted to a housing within a bore. The annular seal member is coupled to the case and extends radially inward therefrom. A seal lip is formed into the annular seal member and is adapted to provide a seal between the housing and a shaft. The annular guide member is coupled to one of the case and the seal member and extends radially inward therefrom. The annular guide includes an inner tip which extends radially inward beyond the seal lip when the seal assembly is in a free state disengaged from the shaft. The inner tip of the annular guide is adapted to protect the sealing integrity of the seal lip when the seal assembly and the shaft are assembled to one another. A method for installing a seal assembly with a guide member is also provided. The method includes the steps of inserting the shaft in the housing to an overstroked position and returning the shaft to a normal or operating position to thereby disengage the guide member from the case.

9 Claims, 3 Drawing Sheets

INTEGRAL SEAL PROTECTOR/LABYRINTH

BACKGROUND OF THE INVENTION

1. Technical Field

The present invention relates to radial lip seals and more particularly to a radial lip seal having an integral seal protector which protects the sealing integrety of the radial lip seal when the seal is brought into sealing engagement with a shaft.

2. Discussion

Radial lip seals are typically used in vehicle axle assemblies for providing a seal between a rotating axle spindle or shaft and a non-rotatable hub or housing disposed about the shaft. Radial lip seals of this type are provided to both retain lubricant within the wheel hub and to prevent dirt and other contaminants from entering therein. Known lubricant seal assemblies typically include an annular metallic outer case or can which is press-fit within a bore formed in the housing. An annular seal member formed from a resilient material and having a seal lip is mounted concentrically within the can. The axle spindle extends through the annular seal and is free to rotate therewith relative to the can. The end of the axle spindle which extends through the radial lip seal typically includes a plurality of splines or teeth, which provide a degree of axial freedom within the axle assembly.

During the process of installing the radial lip seal and the axle shaft, the axle shaft is frequently inserted through the annular seal member. Assembly in this manner permits the splines of the axle shaft to directly contact the seal lip. As the splines of the axle shaft are frequently sharp or burred, such contact can damage the seal lip and compromise the sealing integrety of the radial lip seal.

SUMMARY OF THE INVENTION

It is one object of the present invention to provide a seal assembly having a guide member to protect the lip of the seal during the assembly of a shaft and the seal assembly.

It is another object of the present invention to provide a method for installing a seal assembly having a guide member.

An improved seal assembly having a case, an annular seal member and an annular guide member. The case is adapted to be mounted to a housing within a bore. The annular seal member is coupled to the case and extends radially inward therefrom. A seal lip is formed into the annular seal member and is adapted to provide a seal between the housing and a shaft. The annular guide member is coupled to one of the case and the seal member and extends radially inward therefrom. The annular guide includes an inner tip which extends radially inward beyond the seal lip when the seal assembly is in a free state disengaged from the shaft. The inner tip of the annular guide is adapted to protect the sealing integrity of the seal lip when the seal assembly and the shaft are assembled to one another. A method for installing a seal assembly with a guide member is also provided. The method includes the steps of inserting the shaft in the housing to an overstroked position and returning the shaft to a normal or operating position to thereby disengage the guide member from the case.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
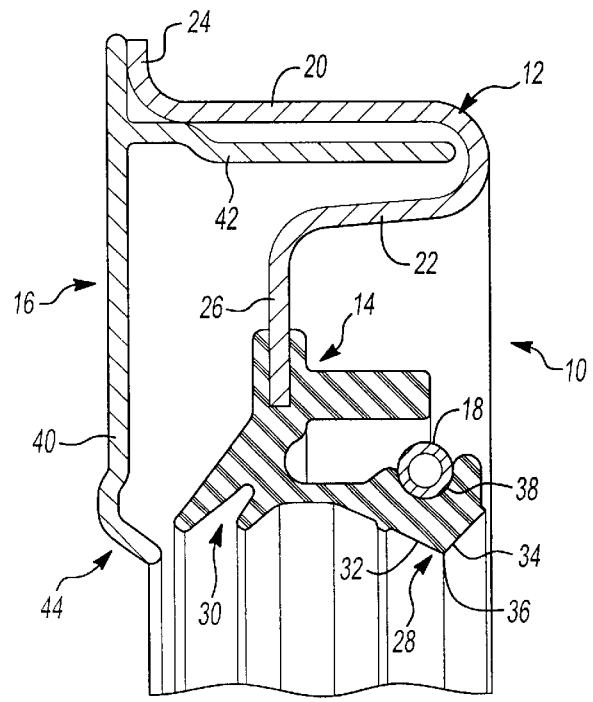
FIG. 1 is a cross-sectional view of a portion of a seal assembly constructed in accordance with the teachings of a first embodiment of the present invention.

With reference to FIG. 1 of the drawings, a seal assembly constructed in accordance with the teachings of a first embodiment of the present invention is generally indicated by reference numeral 10. Seal assembly 10 is shown to include a case or can 12, an annular seal member 14, an annular guide member 16 and a spring member 18. Case 12 is illustrated to be generally U-shaped and includes first and second axially extending wall members 20 and 22, respectively, and first and second radially projecting members 24 and 26, respectively.

Annular seal member 14 is bonded to second radially projecting member 26 and extends radially inward therefrom. Annular seal member 14 is a conventional elastomeric seal body having a first seal lip 28 and a second lip 30, sometimes called a dirt or dust lip. First seal lip 28 includes converging, axially inner and outer frustroconical surfaces 32 and 34 which meet along a generally circular locus to form a primary seal band 36 of intended contact with a mating shaft. Spring member 18, commonly referred to as a garter spring, is received within an annular groove 38 in annular seal member 14 and provides a radial load for sealing first seal lip 28 against a mating shaft in a known manner.

Annular guide member 16 is shown to include a radially extending portion 40 and an axially projecting portion 42. Radially extending portion 40 terminates at an inner tip 44 which extends radially inward beyond seal lips 28 and 30 when seal assembly 10 is in a free state (i.e., disengaged from a mating shaft). Axially projecting portion 42 is coupled to radially extending portion 40 and extends generally perpendicular therefrom. Axially projecting portion 42 is adapted to contact one of the first and second axially extending wall members 20 and 22 to couple annular guide member 16 and case 12 together. Annular guide member 16 is preferably formed from a plastic to provide inner tip 44 and axially projecting portion 42 with a predetermined degree of resiliency.

Figure 2:
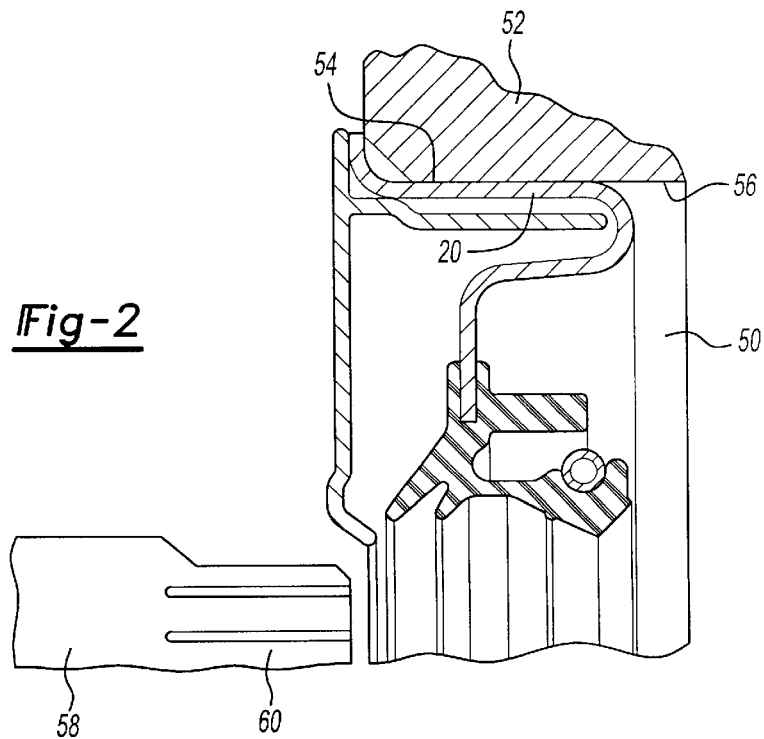
FIG. 2 is a view of the seal assembly of FIG. 1 in operative association with a housing.
Figure 3:
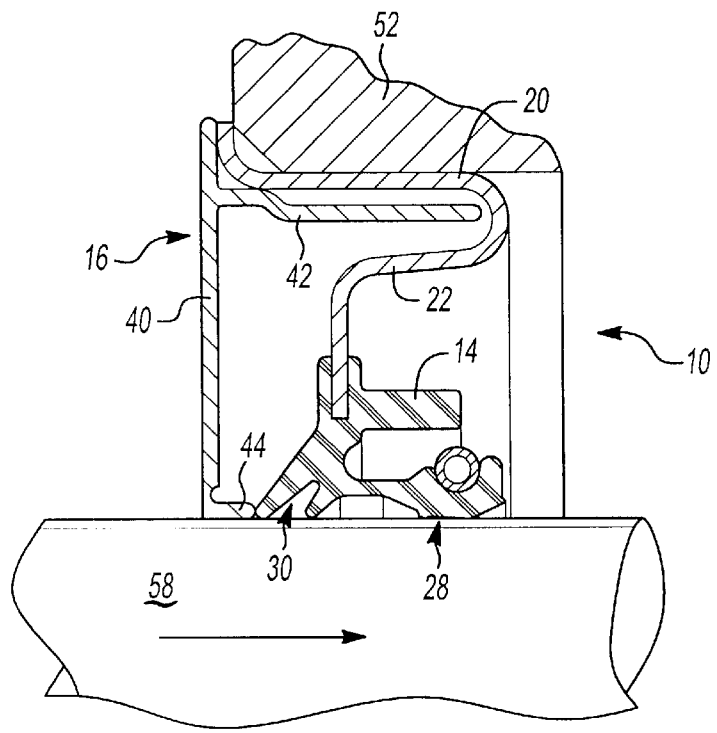
FIG. 3 is a view similar to FIG. 2 but illustrating the seal assembly in operative association with a shaft when the shaft is in an overstroke position.
Figure 4:
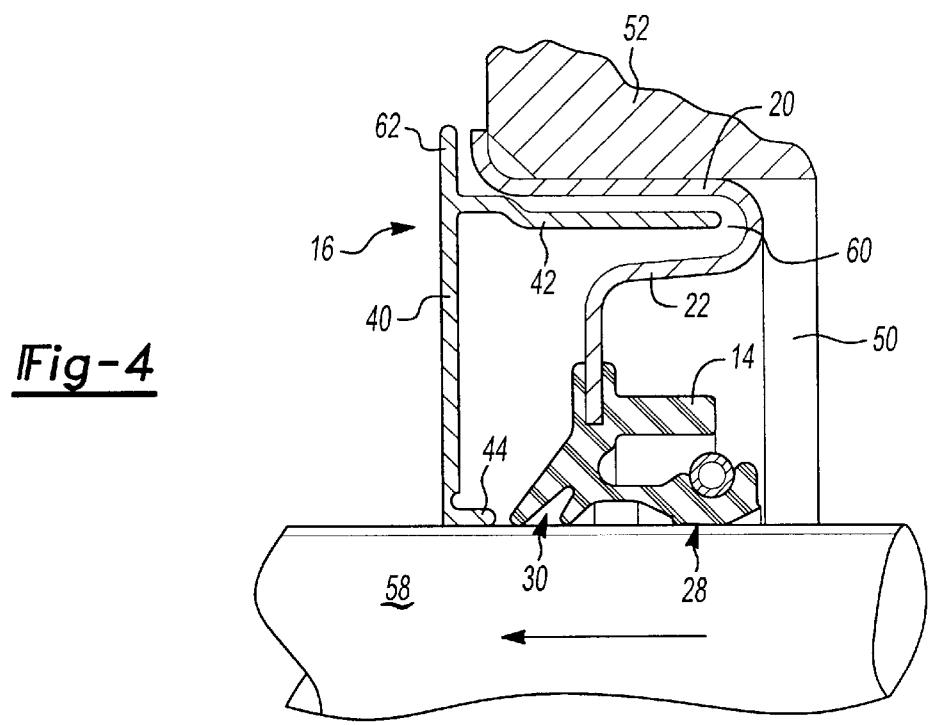
FIG. 4 is a view similar to that of FIG. 3 but illustrating the shaft and seal assembly when the shaft has been returned to a normal or running position.

The installation of seal assembly 10 is illustrated in FIGS. 2 through 4. In FIG. 2, seal assembly 10 is shown mounted within a bore 50 of a housing 52. A mounting surface 54 is formed by the outer surface of first axially extending wall member 20 and is in sealed contact with the inner surface 56 of the bore 50 such that seal assembly 10 and bore 50 are positioned concentrically to one another. A shaft 58 having a splined end 60 is placed proximate housing 52.

In FIG. 3, the splined end 60 of shaft 58 is introduced through bore 50 and seal assembly 10. Contact between shaft 58 and annular guide member 16 causes inner tip 44 to deflect toward annular seal member 14, enabling the inner tip 44 to guide the shaft 58 as it is installed and thereby protect the sealing integrity of seal lips 28 and 30 when seal assembly 10 and the shaft 58 are assembled to one another. Insertion of shaft 58 is continued until a predetermined overstroke position has been reached. At or prior to the overstroke position, the inner tip 44 couples to the shaft 58, preferably via a press fit.

The shaft 58 is then retracted to its normal or running position, causing the annular guide member 16 to uncouple from the case 12 as shown in FIG. 4. The annular guide member 16 is fixed for rotation with shaft 58, while case 12 and annular seal member 14 remain fixed to housing 52. Thereafter, the case 12 and the annular guide member 16 cooperate to form a labyrinth 60 to guard against damaging contact between the annular seal member 14 and a foreign object. The labyrinth 60 is formed by the outer tip 62 of the radially extending portion 40, the axially projecting portion 42 and the first and second axially extending wall members 20 and 22.

Those skilled in the art should readily understand that the installation process discussed above might be modified in numerous ways. For example, the shaft 58 may first be installed within the bore 50 and the seal assembly 10 installed to the housing 52 and shaft 58 simultaneously thereafter. When installing the seal assembly 10 in this manner, it remains necessary to place shaft 58 in its overstroked position prior to properly position the annular guide member 16 along the shaft 58 relative to the case 12.

Figure 5:
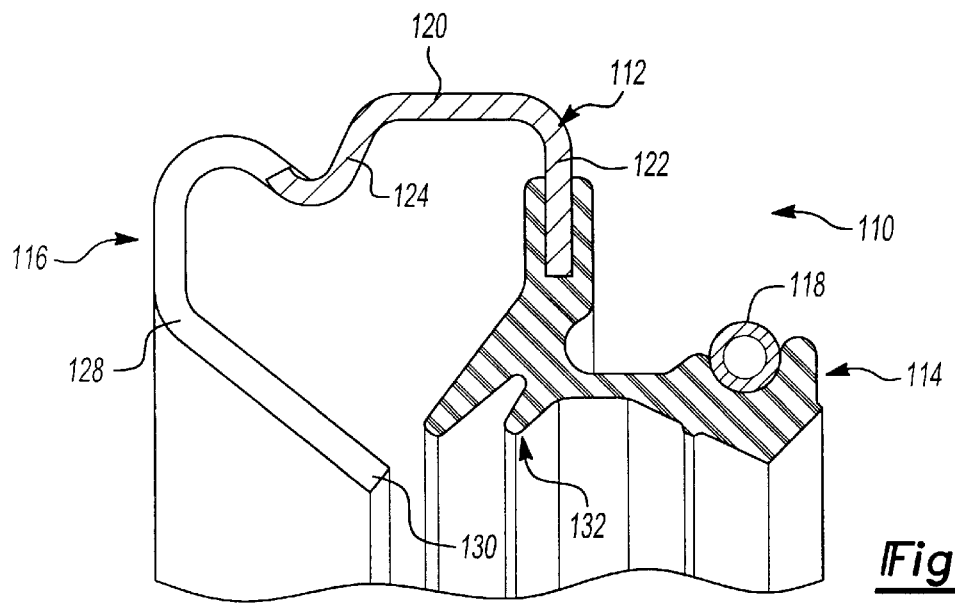
FIG. 5 is a cross-sectional view of a portion of a seal assembly constructed in accordance with the teachings of a second embodiment of the present invention.

A seal assembly constructed in accordance with the teachings of a second embodiment of the present invention is generally indicated by reference numeral 110 in FIG. 5. Seal assembly 110 is shown to include a case or can 112, an annular seal member 114, an annular guide member 116 and a spring member 118. Annular seal member 114 and spring member 118 are substantially similar to annular seal member 14 and spring member 18, respectively, and as such, will not be discussed in detail.

Case 112 is illustrated to be generally U-shaped, having an axially projecting member 120 disposed between first and second radially extending members 122 and 124, respectively. Annular seal member 114 is bonded to first radially extending member 122 and extends radially inward therefrom. Second radially extending member 124 is illustrated to be generally J-shaped, extending both radially inward from axially projecting member 120 and axially away therefrom.

Annular guide member 116 is coupled to second radially extending member 124. Annular guide member 116 is shown to include a radially extending portion 128 that terminates at an inner tip 130. Inner tip 130 extends radially inward beyond the seal lip 132 when seal assembly 110 is in a free state (i.e., disengaged from a mating shaft). Annular guide member 116 is preferably formed from a plastic to provide radially extending portion 128 with a predetermined degree of resiliency.

Figure 6:
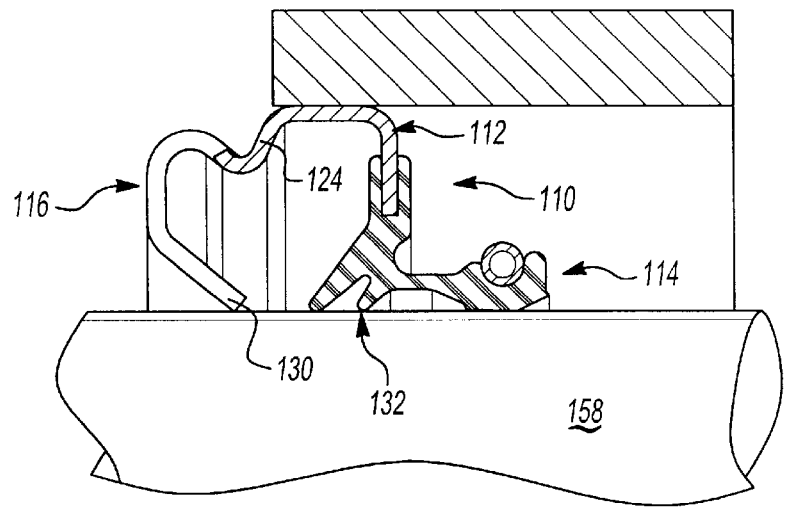
FIG. 6 is a view of the seal assembly of FIG. 5 in operative association with a housing and a shaft.

As shown in FIG. 6, installation of seal assembly 110 is substantially similar to that for seal assembly 10 in that contact between a shaft 158 and annular guide member 116 causes inner tip 130 to deflect toward annular seal member 114, enabling the inner tip 130 to guide the shaft 158 as it is installed and protect the sealing integrity of seal lip 132 when seal assembly 110 and the shaft 158 are assembled to one another. However, there is no need to overstroke the shaft 158 since the annular guide member 116 is fixedly coupled to the case 112. In operation, the inner tip 130 remains adjacent to shaft 158 and performs much like a deflector to protect the annular seal member 114 against damaging contact from a foreign object.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

We claim:

1. A seal assembly for providing a seal between a housing and a shaft extending through a bore formed in the housing, the seal assembly comprising:

a case adapted to be mounted to the housing within the bore and about the shaft;

an annular seal member having a seal lip, the seal member coupled to the case and extending radially inward therefrom, the seal member adapted to provide a seal between the housing and the shaft; and an annular guide member coupled to one of the case and the seal member and extending radially inward therefrom, the annular guide including a flexible inner tip that extends radially inward beyond the seal lip when the seal assembly is in a free state disengaged from the shaft;

the tip being configured to deflect in response to contact with the shaft and extend axially toward the seal lip; and wherein the inner tip of the annular guide is adapted to protect the sealing integrity of the seal lip when the seal assembly and the shaft are assembled to one another.

2. The seal assembly of claim 1, wherein the annular guide member includes an axially extending member disposed between first and second wall members formed in the case, the axially extending member cooperating with the first and second wall members to form a labyrinth to guard against damaging contact between the annular seal member and a foreign object.

3. The seal assembly of claim 2, wherein a portion of the laterally extending member is adapted to engage one of the first and second wall members to couple the annular guide member to the case.

4. The seal assembly of claim 1, wherein the annular guide member is coupled to the case.

5. The seal assembly of claim 4, wherein the annular guide member forms a deflector adapted to protect the annular seal member against damaging contact from a foreign object.

6. The seal assembly of claim 1, wherein the annular guide member is formed from a plastic.

7. A seal assembly for providing a seal between a housing and a shaft extending through a bore formed in the housing, the seal assembly comprising:

a case adapted to be mounted to the housing within the bore and about the shaft, the case including a laterally projecting wall member;

an annular seal member having a seal lip, the seal member coupled to the case and extending radially inward therefrom, the seal member adapted to provide a seal between the housing and the shaft; and an annular guide member having a radially extending portion and a laterally extending portion, the laterally extending portion coupled to the case, the radially extending portion including a flexible inner tip which extends radially inward beyond the seal lip when the seal assembly is in a free state disengaged from the shaft;

wherein the inner tip of the annular guide member is adapted to protect the sealing integrity of the seal lip when the seal assembly and the shaft are assembled to one another; and wherein the laterally extending portion cooperates with the wall member to form a labyrinth to guard against damaging contact between the annular seal member and a foreign object.

8. A method for installing a seal assembly, the method comprising the steps of:

providing a housing having a bore formed therethrough;

providing a shaft;

providing a seal having a case and an annular seal member, the annular seal member having a seal lip, the seal member coupled to the case and extending radially inward therefrom;

providing an annular guide having a radially extending portion and a laterally extending portion, the laterally extending portion coupled to the case, the radially extending portion including a flexible inner tip which extends radially inward beyond the seal lip when the seal is in a free state;

mounting the annular guide and the seal to the housing within the bore; and inserting the shaft through the annular guide, the seal and the bore in the housing such that the tip of the annular guide member protects the sealing integrity of the seal lip when the shaft is installed through the seal.

9. The method of claim 8, wherein the step of inserting the shaft includes the steps of:

moving the shaft axially within the bore in a first direction to an overstroked position; and moving the shaft axially within the bore in a second direction opposite the first direction to disengage the annular guide member from the case and form a labyrinth to guard against damaging contact between the annular seal member and a foreign object.

* * * * *